(12) United States Patent
Xu et al.

(10) Patent No.: US 9,478,353 B2
(45) Date of Patent: Oct. 25, 2016

(54) SYMMETRIC-TYPE UPS POWER SYSTEM BASED ON A NINE-PHASE PHASE-SHIFTING AUTOTRANSFORMER

(71) Applicant: GUANGDONG EAST POWER CO., LTD., Dongguan, Guangdong (CN)

(72) Inventors: Haibo Xu, Guangdong (CN); Shengfa Zhang, Guangdong (CN); Jiarong Wang, Guangdong (CN); Zhaoyang Tang, Guangdong (CN)

(73) Assignee: GUANGDONG EAST POWER CO., LTD., Dongguan, Guangdong (CN)

( * ) Notice: Subject to any disclaimer, the term of this patent is extended or adjusted under 35 U.S.C. 154(b) by 192 days.

(21) Appl. No.: 14/395,123

(22) PCT Filed: Sep. 27, 2012

(86) PCT No.: PCT/CN2012/082210
§ 371 (c)(1),
(2) Date: Oct. 17, 2014

(87) PCT Pub. No.: WO2013/155819
PCT Pub. Date: Oct. 24, 2013

(65) Prior Publication Data
US 2015/0069955 A1    Mar. 12, 2015

(30) Foreign Application Priority Data

Apr. 20, 2012   (CN) .......................... 2012 1 0117736

(51) Int. Cl.
*H02J 7/00* (2006.01)
*H02M 3/335* (2006.01)
*H02M 7/00* (2006.01)
(Continued)

(52) U.S. Cl.
CPC .............. *H01F 38/14* (2013.01); *H01F 30/12* (2013.01); *H02J 7/025* (2013.01); *H02J 9/06* (2013.01); *H02M 5/453* (2013.01); *H02J 3/01* (2013.01);
(Continued)

(58) Field of Classification Search
CPC ........................................................ H02J 7/025
USPC ........................................................ 320/107
See application file for complete search history.

(56) References Cited

U.S. PATENT DOCUMENTS

| 8,737,097 B1* | 5/2014 | Swamy | H02M 5/458 363/67 |
| 2013/0083574 A1* | 4/2013 | Feng | H01F 30/02 363/64 |

*Primary Examiner* — Edward Tso
*Assistant Examiner* — Ahmed Omar
(74) *Attorney, Agent, or Firm* — Jackson IPG PLLC; Demian K. Jackson

(57) ABSTRACT

A symmetric-type UPS power system based on a nine-phase phase-shifting autotransformer includes a three-phase AC power input terminal, a three-phase AC power output terminal, a nine-phase phase-shift autotransformer, a synchronized control device for controlling output of a three-phase inverter, a power-frequency isolation transformer and three circuits of output devices; wherein the three-phase AC input terminal of the nine-phase phase-shifting autotransformer is connected to the three-phase AC power input terminal, each circuit of the output devices includes a zero-sequence suppression commutating inductor, a three-phase six-pulse rectifier, a three-phase inverter and a filter inductor which are connected with each other in sequence, each circuit of the zero-sequence suppression commutating inductor is connected to the three-phase AC output terminal of the phase-shifting autotransformer, each circuit of the filter inductor is connected to the input terminal of the power-frequency isolation transformer.

10 Claims, 3 Drawing Sheets

(51) Int. Cl.
*H01F 38/14* (2006.01)
*H01F 30/12* (2006.01)
*H02J 7/02* (2016.01)
*H02J 9/06* (2006.01)
*H02M 5/453* (2006.01)
*H02J 3/01* (2006.01)

(52) U.S. Cl.
CPC ................ *Y02E 40/10* (2013.01); *Y02E 40/40* (2013.01); *Y10T 307/344* (2015.04)

SYMMETRIC-TYPE UPS POWER SYSTEM BASED ON A NINE-PHASE PHASE-SHIFTING AUTOTRANSFORMER

FIELD OF THE INVENTION

The invention belongs to the technical field of a power supply, and particularly relates to the technical field of a high-power power-frequency uninterruptible power supply (UPS), in particular to a symmetric-type UPS power system based on a nine-phase phase-shifting autotransformer.

BACKGROUND OF THE INVENTION

Demands for high-power power-frequency uninterruptible power supply (UPS) are very large in global industrialization and informatization economic construction. In the field of medium-high-power UPS, the power-frequency UPS has the advantages of good adaptive capacity to power supply environment, high reliability and strong shock resistance of load capacity and the like, thus being widely used in all industries and fields. Particularly, independent and stable zero potential unique to the power-frequency UPS provides a guarantee for safety use of the high-power UPS. Grid-side current of a conventional power-frequency UPS has large current harmonic, which causes serious pollution to power grid; at present, high-power UPS is configured with a power grid compensation device and the like so as to meet the requirements for use of power grid.

In order to solve the problem of power harmonic pollution resulted from input side rectification of the conventional high-power power-frequency UPS, a full-isolation phase-shifting transformer based on "Δ/Y-type and Δ/Δ-type structure" and a multi-pulse rectifier structure of a balance reactor are adopted for input of a high-power system. For example, 12-pulse rectification technology is achieved by two conventional 6-pulse phase-controlled rectifiers connected in parallel with a phase-shift angle of 30° so as to suppress quintuple or septuple harmonic produced by a three-phase six-pulse rectifier. The method has the problem of high cost and the full-isolation phase-shifting transformer is large and heavy, inconvenient for extending of power unit of a higher-power AC-DC rectifier. 18-pulse rectification technology can further reduce grid-side current harmonic, a nine-phase phase-shift power supply thereof is realized usually by an isolation transformer, which has disadvantages of bulky isolation transformer and low economic benefit.

SUMMARY OF THE INVENTION

The invention solves shortcomings of the prior art by providing a symmetric-type UPS power system based on a nine-phase phase-shifting autotransformer. The UPS power system effectively reduces grid-side input current harmonic of the AC-DC rectifier, suppresses quintuple, septuple, elevenfold and thirteenfold harmonic, and reduces content of seventeenfold and ninteenfold harmonic, small in size and low in cost.

In order to achieve the above-mentioned objectives, the invention adopts such a technical scheme as below:

A symmetric-type UPS power system based on a nine-phase phase-shifting autotransformer includes a three-phase AC power input terminal, a three-phase AC power output terminal, a nine-phase phase-shift autotransformer, a synchronized control device for controlling output of a three-phase inverter, a power-frequency isolation transformer and three circuits of output devices; wherein the nine-phase phase-shift autotransformer is a symmetric-type nine-phase phase-shift autotransformer, a three-phase AC input terminal of the nine-phase phase-shifting autotransformer is connected to the three-phase AC power input terminal; the nine-phase phase-shifting autotransformer is provided with three groups of three-phase AC output terminals, namely output terminals A1, B1 and C1 in an advance group, output terminals A0, B0 and C0 in an original group, and output terminals A2, B2 and C2 in a hysteresis group respectively; the power-frequency isolation transformer is provided with three groups of three-phase input terminals, namely input terminals U1, V1 and W1 in an advance group, input terminals U0, V0 and W0 in an original group, and input terminals U2, V2 and W2 in a hysteresis group respectively; the output terminals U, V and W of the power-frequency isolation transformer are connected to the three-phase AC power output terminal; the three circuits of output devices are an output device in an advance group, an output device in an original group and an output device in a hysteresis group; the output device in an advance group includes a zero-sequence suppression commutating inductor in an advance group, a three-phase six-pulse rectifier in an advance group, a three-phase inverter in an advance group and a filter inductor in an advance group which are connected to each other in sequence; three-phase input terminals of the zero-sequence suppression commutating inductor in an advance group are connected to the output terminals A1, B1 and C1 in an advance group; three-phase AC output terminals of the filter inductor in an advance group are connected to the input terminals U1, V1 and W1 in an advance group; the output device in an original group includes a zero-sequence suppression commutating inductor in an original group, a three-phase six-pulse rectifier in an original group, a three-phase inverter in an original group and a filter inductor in an original group which are connected to each other in sequence; three-phase input terminals of the zero-sequence suppression commutating inductor in an original group are connected to the output terminals A0, B0 and C0 in an original group; three-phase AC output terminals of the filter inductor in an original group are connected to the input terminals U0, V0 and W0 in an original group; the output device in a hysteresis group includes a zero-sequence suppression commutating inductor in a hysteresis group, a three-phase six-pulse rectifier in a hysteresis group, a three-phase inverter in a hysteresis group and a filter inductor in a hysteresis group which are connected to each other in sequence; three-phase input terminals of the zero-sequence suppression commutating inductor in a hysteresis group are connected to the output terminals A2, B2 and C2 in a hysteresis group; three-phase AC output terminals of the filter inductor in a hysteresis group are connected to the input terminals U2, V2 and W2 in a hysteresis group; the synchronized control device is provided with four groups of sampling input terminals respectively connected to the three-phase AC power input terminal, the output terminal of the three-phase inverter in an advance group, the output terminal of the three-phase inverter in an original group and the output terminal of the three-phase inverter in a hysteresis group; the synchronized control device is provided with three groups of control output terminals respectively connected to the control terminal of the three-phase inverter in an advance group, the control terminal of the three-phase inverter in an original group and the control terminal of the three-phase inverter in a hysteresis group.

Further, the power-frequency isolation transformer is a three-phase transformer characterized by coupled isolation of power-frequency four ports and Y/Y connection, the power-frequency isolation transformer is provided with a U-phase magnetic pillar, a V-phase magnetic pillar and a W-phase magnetic pillar, each of which is provided with three independent and identical input windings and a output winding, constituting an output mode for coupled isolation of four ports in which the connection between the primary winding and the secondary winding is a "Y/Y" structure; the input windings on the U-phase magnetic pillar are respectively connected to U1 phase outputted by the three-phase inverter in an advance group, U0 phase outputted by the three-phase inverter in an original group and U2 phase outputted by the three-phase inverter in a hysteresis group; the output winding on the U-phase magnetic pillar is U-phase output; the input windings on the V-phase magnetic pillar are respectively connected to V1 phase outputted by the three-phase inverter in an advance group, V0 phase outputted by the three-phase inverter in an original group and V2 phase outputted by the three-phase inverter in a hysteresis group; the output winding on the V-phase magnetic pillar is V-phase output; the input windings on the W-phase magnetic pillar are respectively connected to W1 phase outputted by the three-phase inverter in an advance group, W0 phase outputted by the three-phase inverter in an original group and W2 phase outputted by the three-phase inverter in a hysteresis group; the output winding on the W-phase magnetic pillar is W-phase output.

Further, the symmetric-type UPS power system based on a nine-phase phase-shifting autotransformer also includes an energy storage device; the energy storage device includes a charger, a storage battery and a coupling unit for controlling directional migration of electric current; three-phase AC input terminal of the charger is connected to the three-phase AC power input terminal, DC output terminal of the charger is connected to the storage battery; the coupling unit includes six diodes, in which, anodes of three diodes are connected to the anode of the storage battery, cathodes of the three diodes are respectively connected to the anode at DC input terminal of the three-phase inverter in an advance group, the anode at DC input terminal of the three-phase inverter in an original group and the anode at DC input terminal of the three-phase inverter in a hysteresis group; cathodes of the other three diodes are respectively connected to the cathode of the storage battery, anodes of the other three diodes are respectively connected to the cathode at DC input terminal of the three-phase inverter in an advance group, the cathode at DC input terminal of the three-phase inverter in an original group and the cathode at DC input terminal of the three-phase inverter in a hysteresis group; voltages at DC input terminal of the three-phase inverter in an advance group, DC input terminal of the three-phase inverter in an original group and DC input terminal of the three-phase inverter in a hysteresis group are more than voltage of the storage battery.

Further, the energy storage device also includes contactors JK1, JK2 and JK3; two diodes D1 and D2 respectively connected to the anode and the cathode at DC input terminal of the three-phase inverter in an advance group are diodes in an advance group; two diodes D3 and D4 respectively connected to the anode and the cathode at DC input terminal of the three-phase inverter in an original group are diodes in an original group; two diodes D5 and D6 respectively connected to the anode and the cathode at DC input terminal of the three-phase inverter in a hysteresis group are diodes in a hysteresis group; the two diodes D1 and D2 in an advance group are respectively connected in parallel to the main contact of the contactor JK1; the two diodes D3 and D4 in an original group are respectively connected in parallel to the main contact of the contactor JK2; the two diodes D5 and D6 in a hysteresis group are respectively connected in parallel to the main contact of the contactor JK3.

Further, the symmetric-type UPS power system based on a nine-phase phase-shifting autotransformer also includes a bypass circuit; the bypass circuit includes a bypass static switching device, the output terminal of the bypass static switching device is connected to the three-phase AC power input terminal.

Further, circuits of the three-phase six-pulse rectifier in an advance group, the three-phase six-pulse rectifier in an original group and the three-phase six-pulse rectifier in a hysteresis group are controllable three-phase rectifier circuits. The controllable three-phase rectifier circuits includes an inductor package consisting of three inductors, six unilateral thyristors and a capacitor. In the six unilateral thyristors, every two of which are connected in tandem series to each other to form three subcircuits, both ends of each subcircuit are respectively connected to the anode and the cathode of the capacitor and thus forming a return circuit, one end of each of the three inductors is respectively connected to middle potential terminals of the three subcircuits, and the other end of each of the three inductors is respectively connected to input terminals of the controllable three-phase rectifier circuits.

Further, circuits of the three-phase inverter in an advance group, the three-phase inverter in an original group and the three-phase inverter in a hysteresis group are three-phase full-bridge inverter circuits; the three-phase full-bridge inverter circuits consist of three single-phase full-bridge circuits, each of the three single-phase full-bridge circuits includes an upper bridge arm and a lower bridge arm, both of which respectively consist of two insulated gate bipolar transistors; wherein, collectors of two insulated gate bipolar transistors of the upper bridge arm are connected to the anodes at the DC input terminals of the three-phase full-bridge inverter circuits, emitting electrodes of the two insulated gate bipolar transistors of the upper bridge arm are respectively connected to collectors of two insulated gate bipolar transistors of the lower bridge arm; emitting electrodes of the two insulated gate bipolar transistors of the lower bridge arm are respectively connected to the cathodes at the DC input terminals of the three-phase full-bridge inverter circuits; two output ports at the output terminal of each of the three single-phase full-bridge circuits are respectively connected to two connection points of the upper bridge arm and the lower bridge arm of the single-phase full-bridge circuit.

Further, circuits of the filter inductor in an advance group, the filter inductor in an original group and the filter inductor in a hysteresis group are LC low-pass filter circuits connected to output terminals of the single-phase full-bridge circuits; the LC low-pass filter circuits include three filter circuits, each of which consists essentially of an inductor and a capacitor and is provided with two input terminals and two output terminals; both input terminals of each of the three filter circuits are respectively connected to the midpoints of bridge arms of the single-phase full-bridge circuits, serving as an input port; both output terminals of each of the three filter circuits serve as an output port, which is respectively connected to corresponding three-phase AC input port of the power-frequency isolation transformer via a fuse.

Further, a main circuit static switching device is arranged between the power-frequency isolation transformer and the three-phase AC power output terminal; the main circuit static switching device consists essentially of three bidirectional thyristors; one end of each of the three bidirectional thyristors is connected to the three-phase AC output terminal of the power-frequency isolation transformer, and the other end of each of the three bidirectional thyristors is respectively connected to the three-phase AC power output terminal.

Further, the bypass static switching device consists essentially of three bidirectional thyristors; one end of each of the three bidirectional thyristors is connected to the input terminal of the bypass circuit, and the other end of each of the three bidirectional thyristors is respectively connected to the three-phase AC power output terminal.

Beneficial effects obtained in the invention are as below: a symmetric-type UPS power system based on a nine-phase phase-shifting autotransformer includes a three-phase AC power input terminal, a three-phase AC power output terminal, a nine-phase phase-shift autotransformer, a synchronized control device for controlling output of a three-phase inverter, a power-frequency isolation transformer and three circuits of output devices; a three-phase AC input terminal of the nine-phase phase-shifting autotransformer is connected to the three-phase AC power input terminal; the nine-phase phase-shifting autotransformer is provided with three groups of three-phase AC output terminals, namely output terminals A1, B1 and C1 in an advance group, output terminals A0, B0 and C0 in an original group, and output terminals A2, B2 and C2 in a hysteresis group respectively; the power-frequency isolation transformer is provided with three groups of three-phase AC input terminals, namely input terminals U1, V1 and W1 in an advance group, input terminals U0, V0 and W0 in an original group, and input terminals U2, V2 and W2 in a hysteresis group respectively; the output terminals U, V and W of the power-frequency isolation transformer are connected to the three-phase AC power output terminal; the three circuits of output devices are an output device in an advance group, an output device in an original group and an output device in a hysteresis group; the output device in an advance group includes a zero-sequence suppression commutating inductor in an advance group, a three-phase six-pulse rectifier in an advance group, a three-phase inverter in an advance group and a filter inductor in an advance group which are connected to each other in sequence; three-phase input terminals of the zero-sequence suppression commutating inductor in an advance group are connected to the output terminals A1, B1 and C1 in an advance group; three-phase AC output terminals of the filter inductor in an advance group are connected to the input terminals U1, V1 and W1 in an advance group; the output device in an original group includes a zero-sequence suppression commutating inductor in an original group, a three-phase six-pulse rectifier in an original group, a three-phase inverter in an original group and a filter inductor in an original group which are connected to each other in sequence; three-phase input terminals of the zero-sequence suppression commutating inductor in an original group are connected to the output terminals A0, B0 and C0 in an original group; three-phase AC output terminals of the filter inductor in an original group are connected to the input terminals U0, V0 and W0 in an original group; the output device in a hysteresis group includes a zero-sequence suppression commutating inductor in a hysteresis group, a three-phase six-pulse rectifier in a hysteresis group, a three-phase inverter in a hysteresis group and a filter inductor in a hysteresis group which are connected to each other in sequence; three-phase input terminals of the zero-sequence suppression commutating inductor in a hysteresis group are connected to the output terminals A2, B2 and C2 in a hysteresis group; three-phase AC output terminals of the filter inductor in a hysteresis group are connected to the input terminals U2, V2 and W2 in a hysteresis group; the synchronized control device is provided with four groups of sampling input terminals respectively connected to the three-phase AC power input terminal and the output terminals of the three-phase inverter in an advance group, the three-phase inverter in an original group and the three-phase inverter in a hysteresis group; the synchronized control device is provided with three groups of control output terminals respectively connected to the control terminal of the three-phase inverter in an advance group, the control terminal of the three-phase inverter in an original group and the control terminal of the three-phase inverter in a hysteresis group.

The invention is characterized by:

(1) A nine-phase phase-shifting autotransformer with a uniquely symmetric structure whose rated power not exceeding 17% of the total output power of the system.

(2) The system topology of a parallel structure guarantees independent running of the AC power supply with three groups of phase position with a mutual phase difference of 20°, so as to provide identical power to load, thus accurately achieving "18-pulse rectification" of the whole power system and effectively reducing current harmonic of power grid.

(3) DC/AC inverter of the parallel structure guarantees balance of three parallel channels and constitutes redundant design of the system, with a high reliability of the whole system.

(4) The uniquely designed the power-frequency "three-phase transformer characterized by coupled isolation of power-frequency four ports and Y/Y connection" realizes isolated coupling of AC output of three independent and parallel channels, leads to an independent output of the three-phase transformer, suitable for unbalance load.

(5) The power-frequency power system is not provided with a balance reactor, designed standardly and symmetrically with high redundancy rate; the topological structure thereof is suitable for UPS power systems with a wide power range and a capacity more than 500 KVA.

REFERENCE NUMERALS OF DRAWINGS

Figure 1:
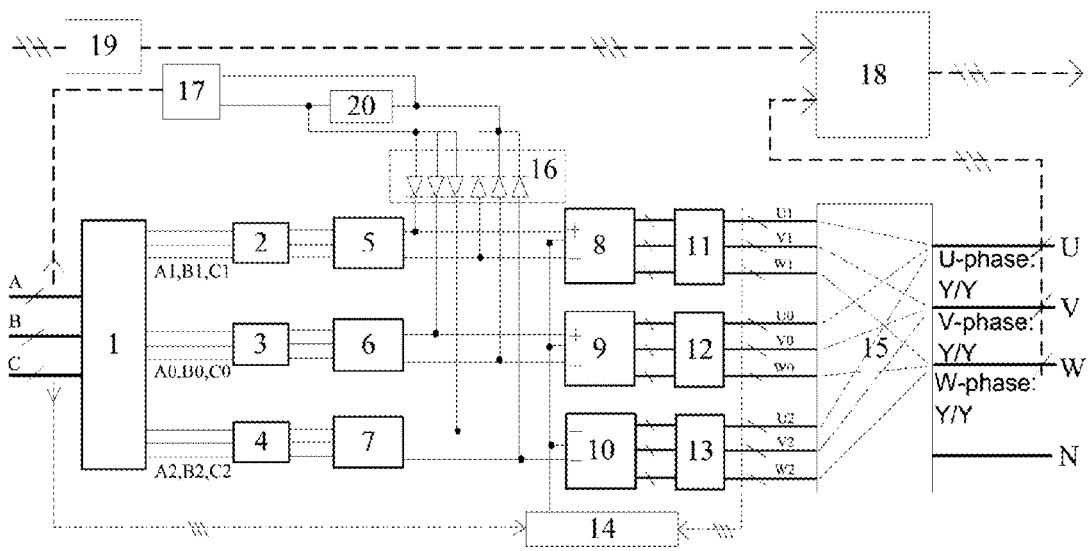
FIG. 1 is a structure diagram of the invention.

1—the nine-phase phase-shifting autotransformer; 2—the zero-sequence suppression commutating inductor in an advance group;

3—the zero-sequence suppression commutating inductor in an original group; 4—the zero-sequence suppression commutating inductor in a hysteresis group;

5—the three-phase six-pulse rectifier in an advance group; 6—the three-phase six-pulse rectifier in an original group; 7—the three-phase six-pulse rectifier in a hysteresis group;

8—the three-phase inverter in an advance group; 9—the three-phase inverter in an original group;

10—the three-phase inverter in a hysteresis group;
11—the filter inductor in an advance group;
12—the filter inductor in an original group; 13—the filter inductor in a hysteresis group;
14—the synchronized control device; 15—the power-frequency isolation transformer;
16—the coupling unit; 17—the charger; 18—the three-phase AC power output terminal;
19—the input terminal of the bypass circuit; 20—the storage battery.

DETAILED DESCRIPTION OF THE EMBODIMENTS

Further description of the invention is made in conjunction with the accompanying drawings and embodiments.

Embodiment: as shown in FIGS. 1-4, a symmetric-type UPS power system based on a nine-phase phase-shifting autotransformer 1 includes a three-phase AC power input terminal, a three-phase AC power output terminal 18, a nine-phase phase-shift autotransformer 1, a synchronized control device 14 for controlling output of a three-phase inverter, a power-frequency isolation transformer 15 and three circuits of output devices. The nine-phase phase-shift autotransformer 1 is a symmetric-type nine-phase phase-shift autotransformer 1, a three-phase AC input terminal of the nine-phase phase-shifting autotransformer 1 is connected to the three-phase AC power input terminal; the nine-phase phase-shifting autotransformer 1 is provided with three groups of three-phase AC output terminals, namely output terminals A1, B1 and C1 in an advance group, output terminals A0, B0 and C0 in an original group, and output terminals A2, B2 and C2 in a hysteresis group respectively. The power-frequency isolation transformer 15 is provided with three groups of three-phase AC input terminals, namely input terminals U1, V1 and W1 in an advance group, input terminals U0, V0 and W0 in an original group, and input terminals U2, V2 and W2 in a hysteresis group respectively; the output terminals U, V and W of the power-frequency isolation transformer 15 are connected to the three-phase AC power output terminal 18; the three circuits of output devices are an output device in an advance group, an output device in an original group and an output device in a hysteresis group; the output device in an advance group includes a zero-sequence suppression commutating inductor 2 in an advance group, a three-phase six-pulse rectifier 5 in an advance group, a three-phase inverter 8 in an advance group and a filter inductor 11 in an advance group which are connected to each other in sequence; three-phase input terminals of the zero-sequence suppression commutating inductor 2 in an advance group are connected to the output terminals A1, B1 and C1 in an advance group; three-phase AC output terminals of the filter inductor 11 in an advance group are connected to the input terminals U1, V1 and W1 in an advance group; the output device in an original group includes a zero-sequence suppression commutating inductor 3 in an original group, a three-phase six-pulse rectifier 6 in an original group, a three-phase inverter 9 in an original group and a filter inductor 12 in an original group which are connected to each other in sequence; three-phase input terminals of the zero-sequence suppression commutating inductor 3 in an original group are connected to the output terminals A0, B0 and C0 in an original group; three-phase AC output terminals of the filter inductor 12 in an original group are connected to the input terminals U0, V0 and W0 in an original group; the output device in a hysteresis group includes a zero-sequence suppression commutating inductor 4 in a hysteresis group, a three-phase six-pulse rectifier 7 in a hysteresis group, a three-phase inverter 10 in a hysteresis group and a filter inductor 13 in a hysteresis group which are connected to each other in sequence; three-phase input terminals of the zero-sequence suppression commutating inductor 4 in a hysteresis group are connected to the output terminals A2, B2 and C2 in a hysteresis group; three-phase AC output terminals of the filter inductor 13 in a hysteresis group are connected to the input terminals U2, V2 and W2 in a hysteresis group. The synchronized control device is provided with four groups of sampling input terminals respectively connected to the three-phase AC power input terminal and the output terminals of the three-phase inverter in an advance group, the three-phase inverter in an original group and the three-phase inverter in a hysteresis group; the synchronized control device is provided with three groups of control output terminals respectively connected to the control terminal of the three-phase inverter in an advance group, the control terminal of the three-phase inverter in an original group and the control terminal of the three-phase inverter in a hysteresis group.

Input symmetric three-phase AC power supply (A, B and C) is subject to a phase shift by the nine-phase phase-shift autotransformer 1 as three groups of symmetric three-phase AC power supplies with a mutual phase difference of 20°: an original group (A0, B0 and C0), an advance group (A1, B1 and C1) and a hysteresis group (A2, B2 and C2). The phase position in an original group (A0, B0 and C0) is identical to the input three-phase AC power supply (A, B and C), a phase difference of 20° is arranged between the advance group (A1, B1 and C1) and the original group (A0, B0 and C0); a phase difference of 20° is arranged between the hysteresis group (A2, B2 and C2) and the original group (A0, B0 and C0).

As shown in FIG. 1, signals of the original group (A0, B0 and C0), the advance group (A1, B1 and C1) and the hysteresis group (A2, B2 and C2) are transmitted through the corresponding zero-sequence suppression commutating inductor and the corresponding three-phase six-pulse rectifier for achieving six-pulse rectification respectively, and finally outputted to the corresponding three-phase inverter and the corresponding filter inductor, and then subject to AC isolation and parallel connection and power synthesis for output by the power-frequency isolation transformer 15. The zero-sequence suppression commutating inductor has a function of suppressing zero-sequence current, convenient for commutation of current in the three-phase six-pulse rectifier.

Figure 2:
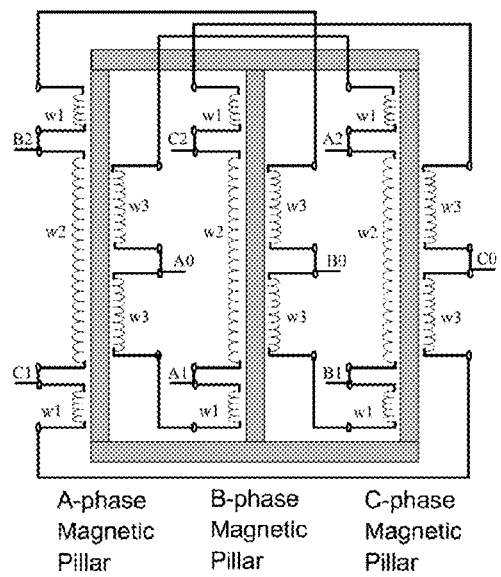
FIG. 2 is a structure diagram of windings of the nine-phase phase-shifting autotransformer in the invention.

FIG. 2 shows a construction of windings and connection diagram of the 18-pulse±20° phase-shifting autotransformer adopted by the invention, namely the nine-phase phase-shifting autotransformer 1. In FIG. 2, the original group (A0, B0 and C0) is input of the transformer, connected to 380V three-phase AC supply of mains supply; (A1, B1 and C1) and (A2, B2 and C2) are two three-phase AC outputs respectively. A phase angle of 20° is arranged between the advance group (A1, B1 and C1) and the original group (A0, B0 and C0), and a phase angle of 20° is arranged between the original group (A0, B0 and C0) and the hysteresis group (A2, B2 and C2). The original group (A0, B0 and C0) of the transformer is connected to three-phase network voltage (A, B and C) for proper functioning. In this way, for achieving 18-pulse rectification effect, power capacity of the nine-phase phase-shifting autotransformer 1 is not more than 20% of the total output power of the system, the nine-phase phase-shifting autotransformer 1 is much less than a conventional isolation power-frequency phase-shifting transformer in terms of structure and weight.

Further, the power-frequency isolation transformer 15 is a three-phase transformer characterized by coupled isolation of power-frequency four ports and Y/Y connection, the power-frequency isolation transformer 15 is provided with three groups of AC input ports and a group of AC output port, one each of the magnetic pillars of the power-frequency isolation transformer 15 is provided with three sections of independent windings which constitute a group of three-phase AC input port, both ends of each section of independent windings are two input terminals of a three-phase AC input port; the connection between the primary winding and the secondary winding of the power-frequency isolation transformer 15 is a "Y/Y" structure.

Figure 3:
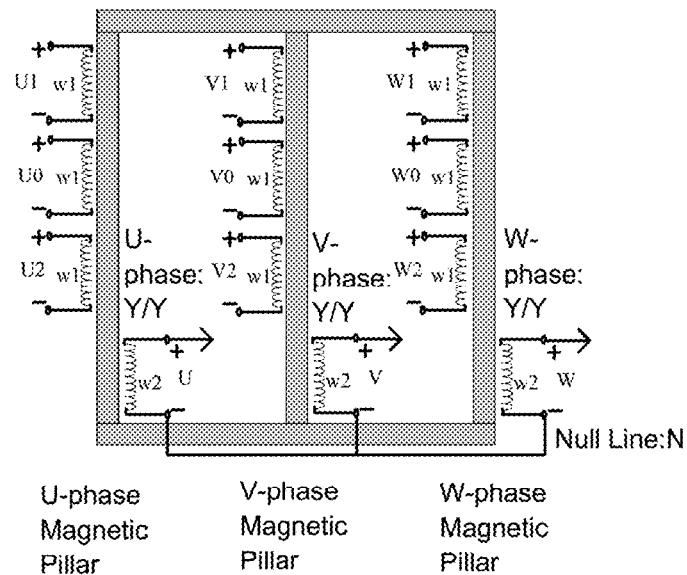
FIG. 3 is a structure diagram of windings of the power-frequency isolation transformer in the invention.
Figure 4:
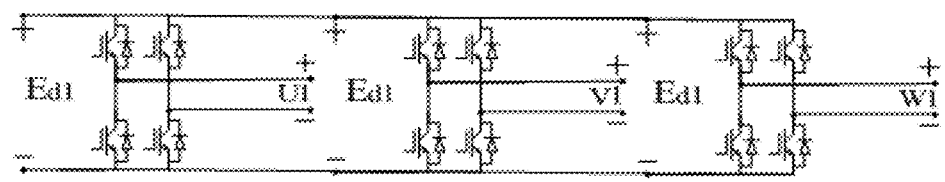
FIG. 4 is a schematic diagram of the three-phase inverter circuits in the invention.

FIG. 3 shows a diagrammatic drawing of the three-phase transformer structure characterized by coupled isolation of four ports and Y/Y connection. In the FIG. 3, [U1, U0 and U2] are respectively reference phase outputs of initial phase angle 00 in the three-phase sinusoidal output of three channels DC/AC inverters, which are controlled to be identical waveform and in-phase with three-phase network mains input. In accordance with winding configuration in FIG. 3, both input and output are of Y/Y-type structures, no-load voltage ratio of the output voltage U to three input voltages is w2/w1, the output current is subject to superposition of three-phase [U1, U0 and U2] input current, namely power superposition. In the same way, the design approach is applicable to the relation between V-phase output and three-phase input [V1, V0 and V2], and applicable to the relation between W-phase output and three-phase input [W1, W0 and W2].

Further, the UPS power system based on a nine-phase phase-shifting autotransformer 1 also includes an energy storage device; the energy storage device includes a charger 17, a storage battery 20 and a coupling unit 16 for controlling directional migration of electric current. Three-phase AC input terminal of the charger 17 is connected to the three-phase AC power input terminal, DC output terminal of the charger 17 is connected to the storage battery 20. The coupling unit 16 includes six diodes, in which, anodes of three diodes are connected to the anode of the storage battery 20, cathodes of the three diodes are respectively connected to the anode at DC input terminal of the three-phase inverter 8 in an advance group, the anode at DC input terminal of the three-phase inverter 9 in an original group and the anode at DC input terminal of the three-phase inverter 10 in a hysteresis group. Cathodes of the other three diodes are respectively connected to the cathode of the storage battery 20, anodes of the other three diodes are respectively connected to the cathode at DC input terminal of the three-phase inverter 8 in an advance group, the cathode at DC input terminal of the three-phase inverter 9 in an original group and the cathode at DC input terminal of the three-phase inverter 10 in a hysteresis group. Voltages at DC input terminal of the three-phase inverter 8 in an advance group, DC input terminal of the three-phase inverter 9 in an original group and DC input terminal of the three-phase inverter 10 in a hysteresis group are more than voltage of the storage battery 20.

In actual operation, under normal circumstance, voltage of the storage battery 20 is slightly less than direct voltage output of the three-phase six-pulse rectifiers, having no effect on two DC output terminals of the three-phase six-pulse rectifier. In case of power outage, the storage battery 20 supplies power to the three-phase inverters via a diode unidirectional access.

Further, the energy storage device also includes contactors JK1, JK2 and JK3; two diodes D1 and D2 respectively connected to the anode and the cathode at DC input terminal of the three-phase inverter 8 in an advance group are diodes in an advance group; two diodes D3 and D4 respectively connected to the anode and the cathode at DC input terminal of the three-phase inverter 9 in an original group are diodes in an original group; two diodes D5 and D6 respectively connected to the anode and the cathode at DC input terminal of the three-phase inverter 10 in a hysteresis group are diodes in a hysteresis group. The two diodes D1 and D2 in an advance group are respectively connected in parallel to the main contact of the contactor JK1; the two diodes D3 and D4 in an original group are respectively connected in parallel to the main contact of the contactor JK2; the two diodes D5 and D6 in a hysteresis group are respectively connected in parallel to the main contact of the contactor JK3.

Contactors JK1, JK2 and JK3 are designed to reduce energy consumption of the coupling unit 16; for example, contactors JK1, JK2 and JK3 are at off-state when the system runs properly, and contactors JK1, JK2 and JK3 are at on-state when the power grid is subject to power outage, the storage battery 20 directly supplies power to the three-phase inverters, the coupling unit 16 is at short-circuit condition, thus reducing energy consumption of the coupling unit 16.

Further, the UPS power system based on a nine-phase phase-shifting autotransformer 1 also includes a bypass circuit; the bypass circuit includes a bypass static switching device, the output terminal of the bypass static switching device is connected to the three-phase AC power output terminal 18.

The bypass circuit is designed to increase stability of the system. The bypass static switching device is closed and directly supplies power via the bypass circuit when the three-phase inverters break down; the input terminal 19 of the bypass circuit is directly connected to mains supply or other power supply units.

Further, circuits of the three-phase six-pulse rectifier 5 in an advance group, the three-phase six-pulse rectifier 6 in an original group and the three-phase six-pulse rectifier 7 in a hysteresis group are controllable three-phase rectifier circuits. The controllable three-phase rectifier circuits include an inductor package consisting of three inductors, six unilateral thyristors and a capacitor. In the six unilateral thyristors, every two of which are connected in tandem series to each other to form three subcircuits, both ends of each subcircuit are respectively connected to the anode and the cathode of the capacitor and thus forming a return circuit, one end of each of the three inductors is respectively connected to middle potential terminals of the three subcircuits, and the other end of each of the three inductors is respectively connected to input terminals of the controllable three-phase rectifier circuits. Here, the input terminals of the controllable three-phase rectifier circuits equivalently serve as the input terminal of the three-phase six-pulse rectifier 5 in an advance group, or the three-phase six-pulse rectifier 6 in an original group or the three-phase six-pulse rectifier 7 in a hysteresis group.

Further, circuits of the three-phase inverter 8 in an advance group, the three-phase inverter 9 in an original group and the three-phase inverter 10 in a hysteresis group are three-phase full-bridge inverter circuits. The three-phase full-bridge inverter circuits consist of three single-phase full-bridge circuits, each of the three single-phase full-bridge circuits includes an upper bridge arm and a lower bridge arm, both of which respectively consist of two insulated gate bipolar transistors; wherein, collectors of two insulated gate bipolar transistors of the upper bridge arm are connected to the anodes at the DC input terminals of the three-phase full-bridge inverter circuits, emitting electrodes of the two insulated gate bipolar transistors of the upper bridge arm are respectively connected to collectors of two insulated gate bipolar transistors of the lower bridge arm; emitting electrodes of the two insulated gate bipolar transistors of the lower bridge arm are respectively connected to the cathodes at the DC input terminals of the three-phase full-bridge inverter circuits; two output ports at the output terminal of each of the three single-phase full-bridge circuits are respectively connected to two connection points of the upper bridge arm and the lower bridge arm of the single-phase full-bridge circuit.

Under normal conditions, a heavy-current balance reactor of large inductive coupling is used for achieving parallel connection of direct current side output of the three groups of six-pulse rectifiers, in this way, the economic benefit from the 18-pulse rectifier is offset. Three parallel and independent inverter channels (see FIG. 1) with identical main circuits instead of bulky balance reactors are respectively adopted in the invention, in this way, the three groups of six-pulse rectifiers are impossible to form ring current via the direct current side, the nine-phase phase-shifting auto-transformer accurately achieves 18-pulse rectification, greatly reducing input current harmonic.

In FIG. 1, the synchronized control device 14 guarantees the parallel and independent inverter channels to run according to the same rule, outputs three-phase voltage with the same phase frequency, phase position and amplitude, and guarantees three-phase voltage output (U, V and W) synchronized with network voltage input (A, B and C).

The invention, by adopting a three-phase full-bridge structure, not only improves the system reliability and redundancy capacity, but also provides the system with stronger unbalance load capacity, conducive to modularized and normative design of the system.

Further, circuits of the filter inductor 11 in an advance group, the filter inductor 12 in an original group and the filter inductor 13 in a hysteresis group are LC low-pass filter circuits connected to output terminals of the single-phase full-bridge circuits; the LC low-pass filter circuits include three filter circuits, each of which consists essentially of an inductor and a capacitor and is provided with two input terminals and two output terminals; both input terminals of each of the three filter circuits are respectively connected to the midpoints of bridge arms of the single-phase full-bridge circuits, serving as an input port; both output terminals of each of the three filter circuits serve as an output port, which is respectively connected to corresponding three-phase AC input port of the power-frequency isolation transformer via a fuse.

Further, a main circuit static switching device is arranged between the power-frequency isolation transformer 15 and the three-phase AC power output terminal 18; the main circuit static switching device consists essentially of three bidirectional thyristors; one end of each of the three bidirectional thyristors is connected to the three-phase AC output terminal of the power-frequency isolation transformer 15, and the other end of each of the three bidirectional thyristors is respectively connected to the three-phase AC power output terminal 18.

Further, the bypass static switching device consists essentially of three bidirectional thyristors; one end of each of the three bidirectional thyristors is connected to the input terminal of the bypass circuit, and the other end of each of the three bidirectional thyristors is respectively connected to the three-phase AC power output terminal 18.

Further description of the invention is made in conjunction with the accompanying drawing 5.

Figure 5:
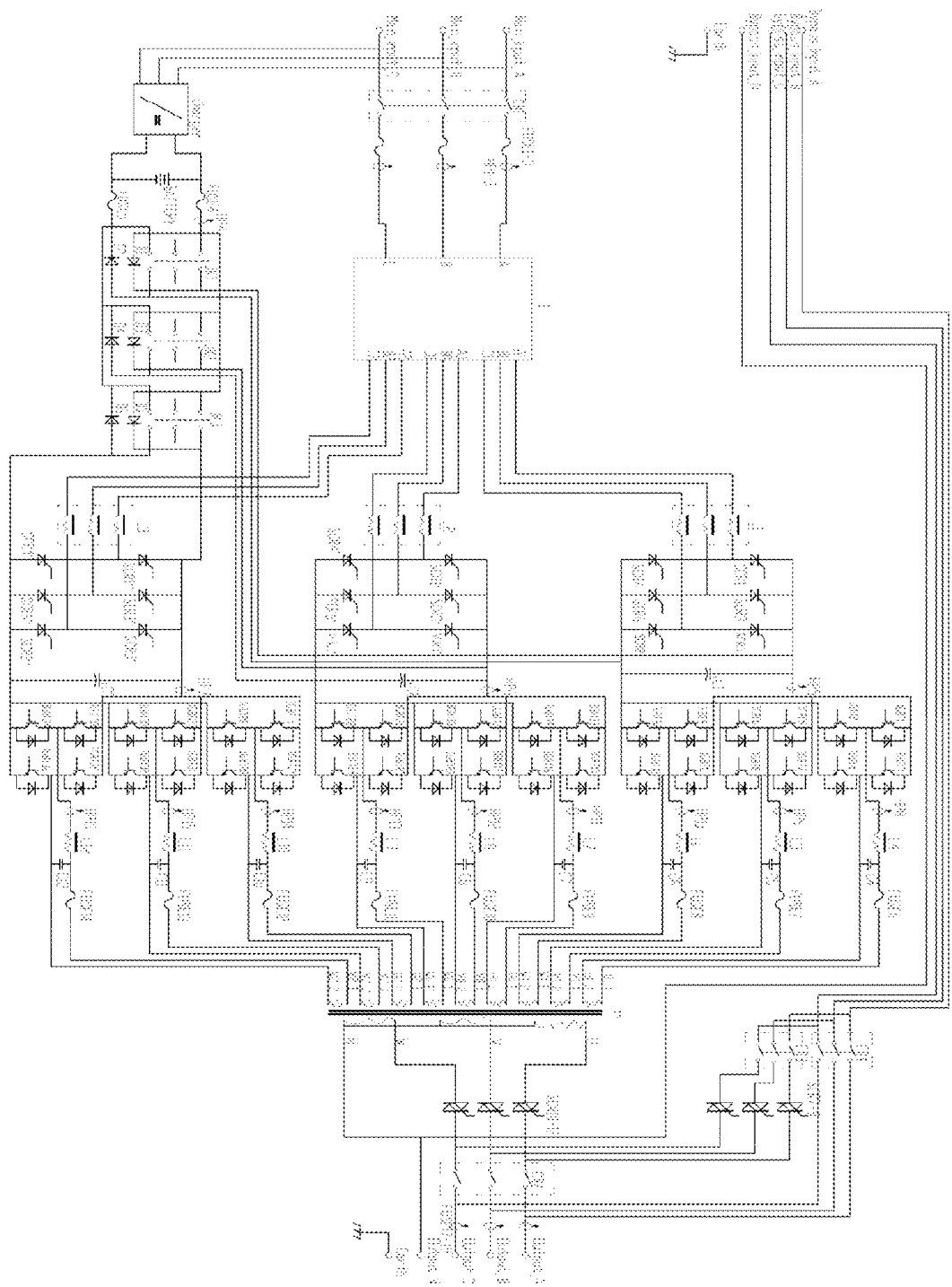
FIG. 5 is a schematic diagram of the invention.

As shown in FIG. 5, T1 is the nine-phase phase-shifting autotransformer of 18-pulse±20°. The controllable three-phase rectifier in an advance group consists of L1, SCR1, SCR3, SCR5, SCR4, SCR6, SCR2 and C1; the three-phase inverter in an advance group consists of IGBT1~IGBT12; the three single-phase inverted full-bridge LC low-pass filter circuits of the inverter in an advance group consist of L4, C4, L5, C5, L6 and C6. In the same way, the three-phase six-pulse rectifier in an original group consists of L2, SCR1', SCR3', SCR5', SCR4', SCR6', SCR2' and C2; the three-phase inverter in an original group consists of IGBT13~IGBT24; the three single-phase inverted full-bridge LC low-pass filter circuits of the inverter in an original group consist of L7, C7, L8, C8, L9 and C9; the three-phase six-pulse rectifier in a hysteresis group consists of L3, SCR1'', SCR3'', SCR5'', SCR4'', SCR6'', SCR2'' and C3; the three-phase inverter in a hysteresis group consists of IGBT25~IGBT36; the three single-phase inverted full-bridge LC low-pass filter circuits of the inverter in a hysteresis group consist of L10, C10, L11, C11, L12 and C12. T2 is the three-phase transformer characterized by coupled isolation of four ports; power superposition is achieved by the power-frequency isolation transformer 15 for output of the single-phase full-bridge inverters in an advance group, in an original group and in a hysteresis group. SCR7-9 are bypass static switches and SCR10-12 are inverter static switches.

Under the circumstance of normal rectification input three-phase supply, three-phase current is transmitted, through a rectifier input breaker CB1, FUSE1-3 and hall current sensors HP1-3 for detecting rectifier input current, to the input terminal of a 18-pulse±20° phase-shifting auto-transformer, the input three-phase AC power supply is subject to a phase shift by the phase-shift autotransformer as three groups of three-phase AC power supplies with a mutual phase difference of 20°: an advance group (U1, V1 and W1), an original group (U0, V0 and W0) and a hysteresis group (U2, V2 and W2). (In FIG. 5, zero-sequence suppression commutating inductors are omitted). The three-phase AC current in an advance group (U1, V1 and W1) is transmitted through and rectified into DC current by the controllable three-phase rectifier in an advance group, transmitted through and inverted into AC current by the three-phase inverter in an advance group, and then output pure three-phase current by the LC low-pass filter circuit. In the same way, The three-phase AC current in an original group (U0, V0 and W0) is transmitted through and rectified into DC current by the three-phase six-pulse rectifier in an original group, transmitted through and inverted into AC current by the three-phase inverter in an original group, and then output pure three-phase current by the LC low-pass filter circuit. The three-phase AC current in a hysteresis group (U2, V2 and W2) is transmitted through and rectified into DC current by the three-phase six-pulse rectifier in a hysteresis group, transmitted through and inverted into AC current by the three-phase inverter in a hysteresis group, and then output pure three-phase current by the LC low-pass filter circuit. Under the control of the synchronized control device 14 (not drawn in FIG. 5), the three groups of AC current output of the same frequency and the same phase with a bypass input AC power supply, with a small difference of amplitude, are transmitted through the three-phase transformer characterized by coupled isolation of four ports for power superposition, and then transmitted through the inverter static switch and an output breaker CB3 to supply power to loads. At the same time, the rectification input three-phase supply charges the storage battery 20 via the isolation charger 17.

Under the circumstance of abnormal operation of the rectification input three-phase supply, the three-phase six-pulse rectifier in an advance group, the three-phase six-pulse rectifier in an original group and the three-phase six-pulse rectifier in a hysteresis group stop running. The storage battery supplies power to the three-phase inverter in an advance group via the diodes D1, D2 and JK1, supplies power to the three-phase inverter in an original group via the diodes D3, D4 and JK2, and supplies power to the three-phase inverter in a hysteresis group via the diodes D5, D6 and JK3 so as to guarantee the three groups of inverters to work uninterruptedly and to supply power to loads uninterruptedly. Once the rectification input three-phase supply returns to normal, the three-phase six-pulse rectifier in an advance group, the three-phase six-pulse rectifier in an original group and the three-phase six-pulse rectifier in a hysteresis group also returns to normal operation, diodes JK1, JK2 and JK3 are disconnected, and the charger 17 returns to normal operation. Due to certain redundancy of the UPS system, when any group of three-phase six-pulse rectifier or three-phase inverter breaks down, the others still can work normally. The UPS system is adaptable to 100% imbalance loads due to adoption of the three-phase full-bridge inverter circuit consisting of three single-phase full-bridge circuits. For example, when none of the three groups of three-phase inverters can work normally, the three-phase static switches SCR10-12 for inverter output are switched off; the bypass three-phase static switches SCR7-9 are switched on. Due to the same frequency and the same phase of inverter three-phase current output with the bypass AC power input, the UPS can be switched to the bypass uninterruptedly; CB3 is a bypass input breaker. When the UPS is required for maintenance, a maintenance bypass of the UPS is used to supply power to loads uninterruptedly; CB4 is a breaker of the maintenance bypass.

The above-mentioned embodiment is a preferred embodiment of the application, equivalent technical scheme based on the embodiment is within the scope of protection of the application.

What is claimed is:

1. A symmetric-type UPS power system based on a nine-phase phase-shifting autotransformer, comprising a three-phase AC power input terminal, a three-phase AC power output terminal, a nine-phase phase-shift autotransformer, a synchronized control device for controlling output of a three-phase inverter, a power-frequency isolation transformer and three circuits of output devices; wherein the nine-phase phase-shift autotransformer is a symmetric-type nine-phase phase-shift autotransformer, a three-phase AC input terminal of the nine-phase phase-shifting autotransformer is connected to the three-phase AC power input terminal; the nine-phase phase-shifting autotransformer is provided with three groups of three-phase AC output terminals, namely output terminals A1, B1 and C1 in an advance group, output terminals A0, B0 and C0 in an original group, and output terminals A2, B2 and C2 in a hysteresis group respectively; the power-frequency isolation transformer is provided with three groups of three-phase input terminals, namely input terminals U1, V1 and W1 in an advance group, input terminals U0, V0 and W0 in an original group, and input terminals U2, V2 and W2 in a hysteresis group respectively; the output terminals U, V and W of the power-frequency isolation transformer are connected to the three-phase AC power output terminal; the three circuits of output devices are an output device in an advance group, an output device in an original group and an output device in a hysteresis group; the output device in an advance group comprising a zero-sequence suppression commutating inductor in an advance group, a three-phase six-pulse rectifier in an advance group, a three-phase inverter in an advance group and a filter inductor in an advance group which are connected to each other in sequence; three-phase input terminals of the zero-sequence suppression commutating inductor in an advance group are connected to the output terminals A1, B1 and C1 in an advance group; three-phase AC output terminals of the filter inductor in an advance group are connected to the input terminals U1, V1 and W1 in an advance group; the output device in an original group comprising a zero-sequence suppression commutating inductor in an original group, a three-phase six-pulse rectifier in an original group, a three-phase inverter in an original group and a filter inductor in an original group which are connected to each other in sequence; three-phase input terminals of the zero-sequence suppression commutating inductor in an original group are connected to the output terminals A0, B0 and C0 in an original group; three-phase AC output terminals of the filter inductor in an original group are connected to the input terminals U0, V0 and W0 in an original group; the output device in a hysteresis group comprising a zero-sequence suppression commutating inductor in a hysteresis group, a three-phase six-pulse rectifier in a hysteresis group, a three-phase inverter in a hysteresis group and a filter inductor in a hysteresis group which are connected to each other in sequence; three-phase input terminals of the zero-sequence suppression commutating inductor in a hysteresis group are connected to the output terminals A2, B2 and C2 in a hysteresis group; three-phase AC output terminals of the filter inductor in a hysteresis group are connected to the input terminals U2, V2 and W2 in a hysteresis group; the synchronized control device is provided with four groups of sampling input terminals respectively connected to the three-phase AC power input terminal, the output terminal of the three-phase inverter in an advance group, the output terminal of the three-phase inverter in an original group and the output terminal of the three-phase inverter in a hysteresis group; the synchronized control device is provided with three groups of control output terminals respectively connected to the control terminal of the three-phase inverter in an advance group, the control terminal of the three-phase inverter in an original group and the control terminal of the three-phase inverter in a hysteresis group.

2. The symmetric-type UPS power system based on a nine-phase phase-shifting autotransformer of claim 1, wherein the power-frequency isolation transformer is a three-phase transformer characterized by coupled isolation of power-frequency four ports and Y/Y connection, the power-frequency isolation transformer is provided with a U-phase magnetic pillar, a V-phase magnetic pillar and a W-phase magnetic pillar, each of which is provided with three independent and identical input windings and a output winding, constituting an output mode for coupled isolation of four ports in which the connection between the primary winding and the secondary winding is a "Y/Y" structure; the input windings on the U-phase magnetic pillar are respectively connected to U1 phase outputted by the three-phase inverter in an advance group, U0 phase outputted by the three-phase inverter in an original group and U2 phase outputted by the three-phase inverter in a hysteresis group; the output winding on the U-phase magnetic pillar is U-phase output; the input windings on the V-phase magnetic pillar are respectively connected to V1 phase outputted by the three-phase inverter in an advance group, V0 phase outputted by the three-phase inverter in an original group and V2 phase outputted by the three-phase inverter in a hysteresis group; the output winding on the V-phase magnetic pillar is V-phase output; the input windings on the W-phase magnetic pillar are respectively connected to W1 phase outputted by the three-phase inverter in an advance group, W0 phase outputted by the three-phase inverter in an original group and W2 phase outputted by the three-phase inverter in a hysteresis group; the output winding on the W-phase magnetic pillar is W-phase output.

3. The symmetric-type UPS power system based on a nine-phase phase-shifting autotransformer of claim 2, further comprising an energy storage device; wherein the energy storage device comprises a charger, a storage battery and a coupling unit for controlling directional migration of electric current; three-phase AC input terminal of the charger is connected to the three-phase AC power input terminal, DC output terminal of the charger is connected to the storage battery; the coupling unit comprising six diodes, in which, anodes of three diodes are connected to the anode of the storage battery, cathodes of the three diodes are respectively connected to the anode at DC input terminal of the three-phase inverter in an advance group, the anode at DC input terminal of the three-phase inverter in an original group and the anode at DC input terminal of the three-phase inverter in a hysteresis group; cathodes of the other three diodes are respectively connected to the cathode of the storage battery, anodes of the other three diodes are respectively connected to the cathode at DC input terminal of the three-phase inverter in an advance group, the cathode at DC input terminal of the three-phase inverter in an original group and the cathode at DC input terminal of the three-phase inverter in a hysteresis group; voltages at DC input terminal of the three-phase inverter in an advance group, DC input terminal of the three-phase inverter in an original group and DC input terminal of the three-phase inverter in a hysteresis group are more than voltage of the storage battery.

4. The symmetric-type UPS power system based on a nine-phase phase-shifting autotransformer of claim 3, wherein the energy storage device also comprises contactors JK1, JK2 and JK3; two diodes D1 and D2 respectively connected to the anode and the cathode at DC input terminal of the three-phase inverter in an advance group are diodes in an advance group; two diodes D3 and D4 respectively connected to the anode and the cathode at DC input terminal of the three-phase inverter in an original group are diodes in an original group; two diodes D5 and D6 respectively connected to the anode and the cathode at DC input terminal of the three-phase inverter in a hysteresis group are diodes in a hysteresis group; the two diodes D1 and D2 in an advance group are respectively connected in parallel to the main contact of the contactor JK1; the two diodes D3 and D4 in an original group are respectively connected in parallel to the main contact of the contactor JK2; the two diodes D5 and D6 in a hysteresis group are respectively connected in parallel to the main contact of the contactor JK3.

5. The symmetric-type UPS power system based on a nine-phase phase-shifting autotransformer of claim 4, further comprising a bypass circuit; wherein the bypass circuit comprises a bypass static switching device, the output terminal of the bypass static switching device is connected to the three-phase AC power input terminal.

6. The symmetric-type UPS power system based on a nine-phase phase-shifting autotransformer of claim 5, wherein circuits of the three-phase six-pulse rectifier in an advance group, the three-phase six-pulse rectifier in an original group and the three-phase six-pulse rectifier in a hysteresis group are controllable three-phase rectifier circuits, The controllable three-phase rectifier circuits comprising an inductor package consisting of three inductors, six unilateral thyristors and a capacitor, In the six unilateral thyristors, every two of which are connected in tandem series to each other to form three subcircuits, both ends of each subcircuit are respectively connected to the anode and the cathode of the capacitor and thus forming a return circuit, one end of each of the three inductors is respectively connected to middle potential terminals of the three subcircuits, and the other end of each of the three inductors is respectively connected to input terminals of the controllable three-phase rectifier circuits.

7. The symmetric-type UPS power system based on a nine-phase phase-shifting autotransformer of claim 6, wherein circuits of the three-phase inverter in an advance group, the three-phase inverter in an original group and the three-phase inverter in a hysteresis group are three-phase full-bridge inverter circuits; the three-phase full-bridge inverter circuits consist of three single-phase full-bridge circuits, each of the three single-phase full-bridge circuits comprising an upper bridge arm and a lower bridge arm, both of which respectively consist of two insulated gate bipolar transistors; wherein, collectors of two insulated gate bipolar transistors of the upper bridge arm are connected to the anodes at the DC input terminals of the three-phase full-bridge inverter circuits, emitting electrodes of the two insulated gate bipolar transistors of the upper bridge arm are respectively connected to collectors of two insulated gate bipolar transistors of the lower bridge arm; emitting electrodes of the two insulated gate bipolar transistors of the lower bridge arm are respectively connected to the cathodes at the DC input terminals of the three-phase full-bridge inverter circuits; two output ports at the output terminal of each of the three single-phase full-bridge circuits are respectively connected to two connection points of the upper bridge arm and the lower bridge arm of the single-phase full-bridge circuit.

8. The symmetric-type UPS power system based on a nine-phase phase-shifting autotransformer of claim 7, wherein circuits of the filter inductor in an advance group, the filter inductor in an original group and the filter inductor in a hysteresis group are LC low-pass filter circuits connected to output terminals of the single-phase full-bridge circuits; the LC low-pass filter circuits comprising three filter circuits, each of which consists essentially of an inductor and a capacitor and is provided with two input terminals and two output terminals; both input terminals of each of the three filter circuits are respectively connected to the midpoints of bridge arms of the single-phase full-bridge circuits, serving as an input port; both output terminals of each of the three filter circuits serve as an output port, which is respectively connected to corresponding three-phase AC input port of the power-frequency isolation transformer via a fuse.

9. The symmetric-type UPS power system based on a nine-phase phase-shifting autotransformer of claim 8, wherein a main circuit static switching device is arranged between the power-frequency isolation transformer and the three-phase AC power output terminal; the main circuit static switching device consists essentially of three bidirectional thyristors; one end of each of the three bidirectional thyristors is connected to the three-phase AC output terminal of the power-frequency isolation transformer, and the other end of each of the three bidirectional thyristors is respectively connected to the three-phase AC power output terminal.

10. The symmetric-type UPS power system based on a nine-phase phase-shifting autotransformer of claim 9, wherein the bypass static switching device consists essentially of three bidirectional thyristors; one end of each of the three bidirectional thyristors is connected to the input terminal of the bypass circuit, and the other end of each of the three bidirectional thyristors is respectively connected to the three-phase AC power output terminal.

* * * * *